US005282305A

United States Patent [19]

Nutt et al.

[11] Patent Number: 5,282,305

[45] Date of Patent: Feb. 1, 1994

[54] METHOD OF ALIGNING A STRIKER PLATE WITH A LATCH BODY OF A DOOR LATCH MECHANISM

[75] Inventors: Kenneth G. Nutt, Hornchurch; Ronald Pinckney, Dagenham, both of Great Britain

[73] Assignee: Ford Motor Company, Dearborn, Mich.

[21] Appl. No.: 920,307

[22] PCT Filed: Feb. 6, 1991

[86] PCT No.: PCT/GB91/00182

§ 371 Date: Aug. 6, 1992

§ 102(e) Date: Aug. 6, 1992

[87] PCT Pub. No.: WO91/12399

PCT Pub. Date: Aug. 22, 1991

[30] Foreign Application Priority Data

Feb. 8, 1990 [GB] United Kingdom ................ 9002843

[51] Int. Cl.[5] ................................ B23Q 3/18

[52] U.S. Cl. ................................ 29/468; 29/464

[58] Field of Search ................ 29/464, 468, 271; 269/21, 16, 287, 329, 902

[56] References Cited

U.S. PATENT DOCUMENTS

| | | | |
|---|---|---|---|
| 2,946,246 | 7/1960 | Allan | 408/76 |
| 3,794,314 | 2/1974 | Coburn et al. | 269/21 |
| 4,744,135 | 5/1988 | Roels | 29/271 |

*Primary Examiner*—P. W. Echols
*Assistant Examiner*—David P. Bryant
*Attorney, Agent, or Firm*—Daniel M. Stock; Roger L. May

[57] ABSTRACT

A method for individually setting the position of a door striker plate (20) relative to the latch body which has to engage with the striker plate. The tool (22) comprises a plate (40) which locates around the striker plate, and which can be clamped by means of vacuum to the door pillar (14) at any position. The method provides that the striker plate (20) is loosely secured to the door pillar (14), the door (10) is closed so that the latch mounted on the door moves the stalker plate to the correct position for that latch, the tool is operated to clamp the striker plate in that position, the door is opened and the striker plate tightened in that position before releasing the tool.

4 Claims, 4 Drawing Sheets

METHOD OF ALIGNING A STRIKER PLATE WITH A LATCH BODY OF A DOOR LATCH MECHANISM

FIELD OF THE INVENTION

This invention relates to a tool for setting the position of a latch member on a surface. The invention is useful wherever a closure member, such as a door provided with a latch, has to be assembled so that the latch and its striker plate meet up together correctly. The invention is particularly useful for the mass production of articles which include closure members.

In this specification, the term "closure member" includes doors and gates, vehicle boot lids,, tailgates and bonnets and any other closure for an opening which has a latch by which it is held shut. The term "latch" includes any type of latching mechanism for such closures, and will comprise two latch members, one on the closure member and one on a frame surrounding the closure opening. The invention can be used to set the position of either latch member. Normally the term "latch body" will designate the latch member on the closure member, and the term "striker plate" will designate, the latch member fixed on the frame. The term "striker plate" however includes any fixed part of any sort of latching member used for holding a closure member shut, whatever the construction of the fixed part.

BACKGROUND TO THE INVENTION

In the mass production of items such as motor vehicles, manufacturing tolerances exist and in the final assembly of, for example, car doors, the sum of all the relevant tolerances can lead to small inaccuracies in the positioning of the door latch for satisfactory door operation. It is important that the striker plate, which is fitted on the fixed part of the vehicle body is in the correct position relative to the latch, which is fitted to the door edge.

It is customary to provide some degree of adjustability of either the latch or the striker plate so that the two can be correctly set relative to one another during final assembly. It is known to use a jig which fits between the edge of the door and the door pillar and which will set the position of the latch members correctly relative to one another. Such jigs however are awkward to use and are relatively delicate. If they are not handled carefully, they can easily themselves go out of alignment and become worse than useless.

It is normal practice for all the striker plates on a mass production line to be set at a mean position which has been determined as being in the centre of the range of tolerances. During vehicle inspection it is found that this is satisfactory for the majority of vehicles, but that a few vehicles still require to have the striker plates manually adjusted to achieve the correct closing effort. This is labor intensive and requires skilled operatives.

SUMMARY OF THE INVENTION

According to the present invention there is provided a tool for setting the position of a latch member on a surface, the tool comprising a body having a cut-out area adapted to closely surround the latch member, a vacuum chamber below the body bounded, in use, by the underface of the body, by the surface and by a peripheral seal on the body, and means for evacuating the chamber, the tool being adapted to fit on a surface surrounding the latch member without obstructing the closing action of the engagaing latch members.

It is preferred to use the tool to set the position of the striker plate.

By evacuating the vacuum chamber, the tool body can be firmly clamped to the surface in any desired position. Because the tool can f it on the surf ace even when the latch is engaged, it is possible to set the position of the striker plate whilst the latch is engaged.

The tool body preferably comprises a flat rigid plate, the thickness of which is similar, that is, substantially equal to the thickness of a base of the striker plate.

The evacuation means may comprise a vacuum pump connected by means of a flexible tube to the tool body, and the tube preferably enters the tool body in a direction parallel to the plane of the body. This helps to prevent the tool body from obstructing closing action of the latch. The vacuum pump may be driven by compressed air. Compressed air is readily available alongside most mass production lines.

There may be two or more vacuum chambers on each tool body. If the latch striker plate is large relative to the surface, then there may be one vacuum chamber either side of the cut-out area.

The invention also provides a method for setting the position of a latch member on a surface, the method comprising securing one latch member firmly to its mounting surface, securing the other latch member loosely to its mounting surface with its own fixings, closing the latch so that the firmly secured latch member moves the loosely secured latch member to the correct position for that latch, fixing the loosely secured latch member accurately to the surface using temporary fixing means which do not include the member's own fixings, opening the latch, tightening the fixings of the loosely secured latch member, and disengaging the temporary fixing means.

The temporary fixing means preferably comprises a tool as set forth above. The overall dimensions of the tool body are preferably similar to the dimensions of a flat area surrounding the loosely secured latch member.

The loosely secured latch member is preferably the striker plate, and the firmly secured latch member is preferably the latch body.

The temporary fixing means may be mounted on the striker plate before the latch is closed.

DETAILED DESCRIPTION OF THE DRAWINGS

The invention will now be further described, by way of example, with reference to the accompanying drawings, in which.

DESCRIPTION OF PREFERRED EMBODIMENTS

Figure 1:
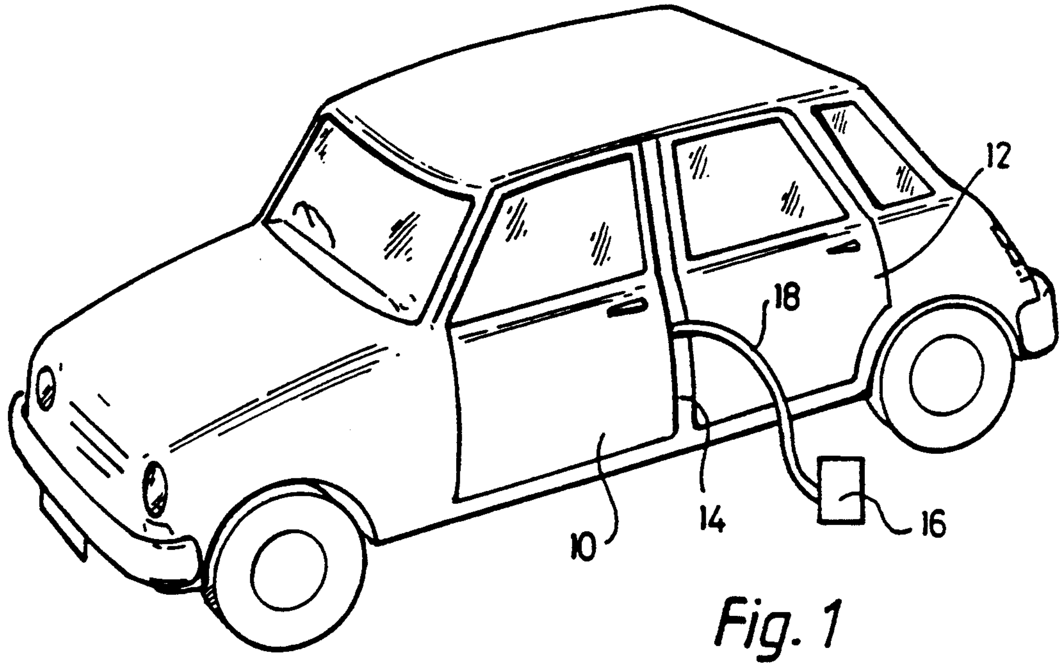
FIG. 1 is a side view of a motor vehicle on which a tool in accordance with the invention will be used.

FIG. 1 shows a side view of a car with a front door 10 and rear door 12. The front door 10 closes onto a door frame, part of which is formed by a door pillar 14. A striker plate will be fitted on the pillar 14, and a latch body on the edge of the door 10. A setting tool is fitted on the striker plate (which cannot be seen in FIG. 1), and this tool includes a control box 16 and a flexible connecting tube 18.

Figure 2:
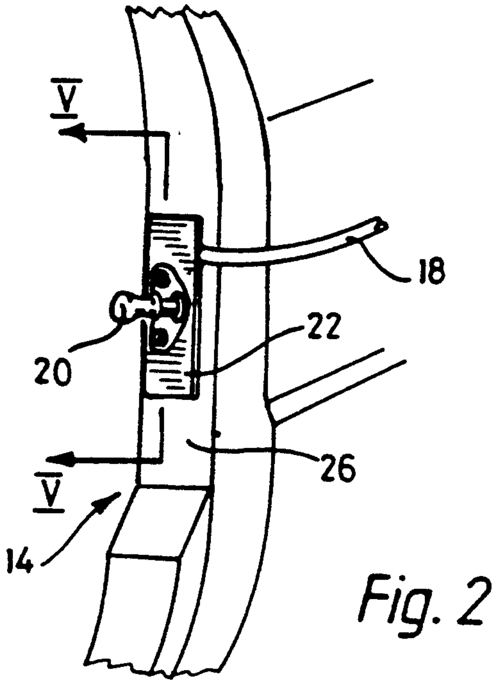
FIG. 2 is a detailed view of a door pillar of the vehicle of FIG. 1, with a tool in accordance with the invention shown in use.

FIG. 2 shows the door pillar 14 with the door 10 moved out of the way. On the pillar 141, a striker plate 20 is fitted, and surrounding this striker plate is a tool 22. The construction of this tool will be described in more detail with reference to the later figures, but the tool is connected by the flexible tube 18 to the control box 16. The tool fits on a part 26 of the door pillar 14 which presents a flat surface.

Figure 3:
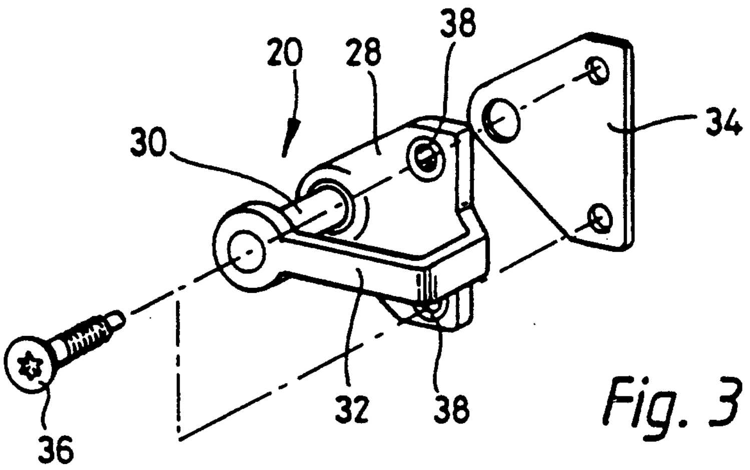
FIG. 3 shows a conventional door striker plate.

FIG. 3 shows a conventional striker plate which itself forms no part of the invention but which can be set in position by means of the tool of the invention. The plate has a base 28 and a striker pin 30 which is supported on the base and braced by a bracing arm 32. In use, part of a latch body engages with the striker pin. A pad 34 is fitted between the base 28 and the vehicle bodywork to allow the base to properly bed onto the bodywork. The plate is secured in place by means of two screws 36 which pass through openings 38 in the base 28.

Figure 4:
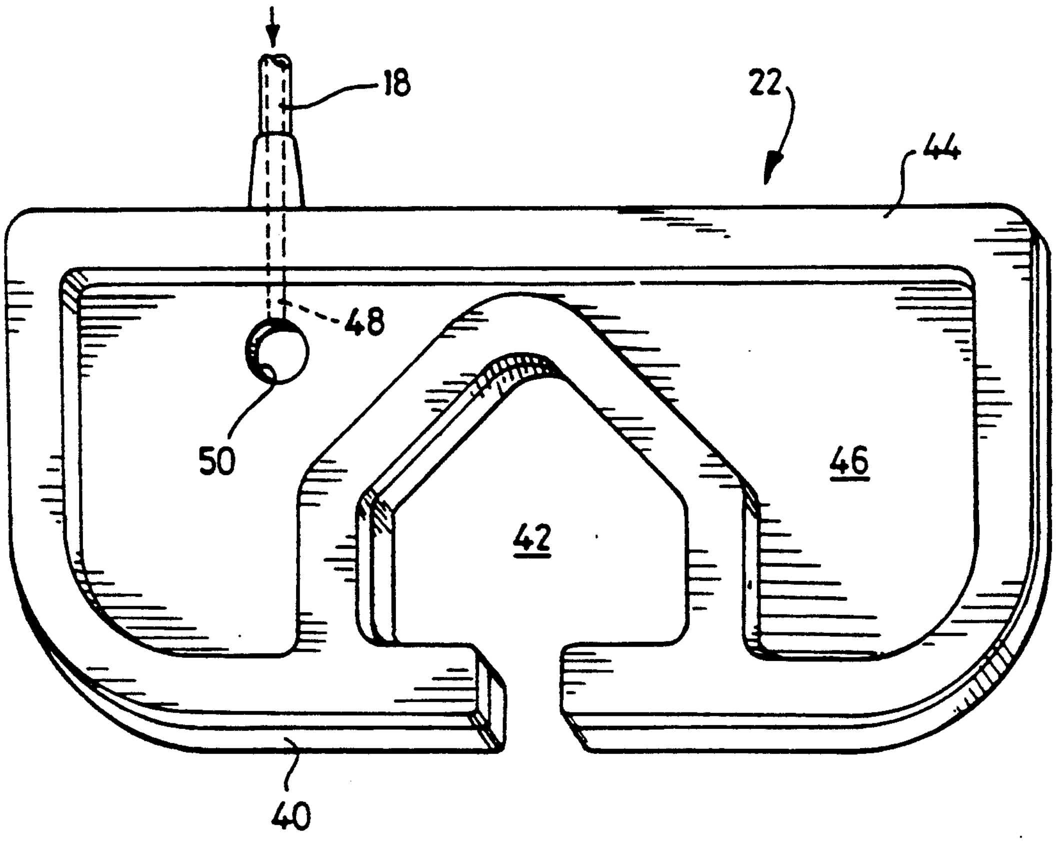
FIG. 4 is a perspective view of part of the tool according to the invention, adapted for use with the striker plate of FIG. 3.
Figure 5:
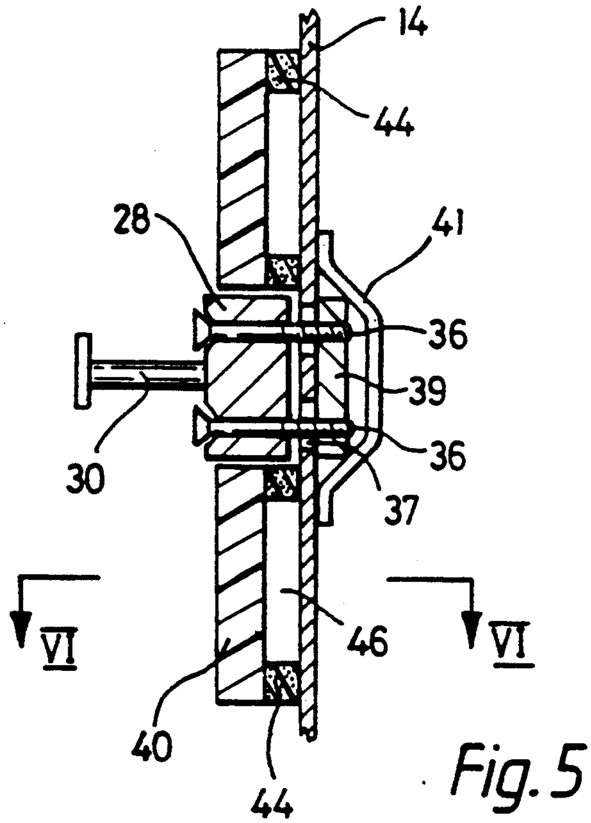
FIG. 5 is a cross section through the tool of FIG. 4, in use, following the line V—V in FIG. 2.

The tool body for use with this striker plate is shown in FIG. 4 which is a view of the underside of the body that is, the side adapted to be positioned against the portion 26 of the vehicle. The body comprises a plate 40 formed of a rigid material, for example a rigid plastics material. The body has a cut-out area 42 and it will be seen that the shape of this area corresponds to the shape of the striker plate base 28. The tool body 22 can therefore be fitted over the striker plate in the manner illustrated in FIG. 2. Around the periphery of the plate 40 a rubber gasket 44 is fitted, and this stands proud from the underface of the plate to define a vacuum chamber 46. The flexible tube 18 leads into the chamber 46 through a drilled bore 48 and a blind hole 50. This construction enables the tube 18 to connect with the plate 40 at one edge. It is important that the tool body itself be flat so that it does not obstruct the closing action of the door 10.

In use, the striker plate 20 is first secured to the door pillar 14 by means of its screws 36. The screws pass through enlarged apertures 37 in the door pillar 14 and into a floating nut body 39 behind the pillar. The nut body has threaded bores for each of the screws 36 and is held captive by a cage 41 welded to the back of the pillar. This allows the striker plate to "float" on the door pillar. The screws 36 are initially not tightened fully and so the striker plate has a limited degree of freedom on the pillar 14. The tool body 22 is then placed on the surface 26 around the striker plate, and the chamber 46 is evacuated by appropriate operation of the control unit 16 so that the tool body is held firmly against the pillar. The door is then closed. This may require more closing effort than desirable if the striker plate is at this point out of the correct alignment with the latch body.

Once the door is closed, the vacuum in the chamber 46 is released. This then allows the striker plate to move under the influence of the latch body which will bring the striker plate to the correct position for proper and accurate mating with the latch body.

The position of the latch body in the door will set the height of the striker pin 30. In order to set the pin at the correct position to ensure that the door will be flush, it may be necessary for the operator to apply pressure to the door, against the weatherseals of the door. As the striker plate moves at this point, the tool body 22 will move with it and once the correct position has been set, then vacuum is reapplied to the chamber 46 thus firmly securing the striker plate in the correct position. Whilst the vacuum is maintained, the door is opened and then the screws 36 can be finally tightened. The tool body is then removed ready for application to another vehicle.

Figure 6:
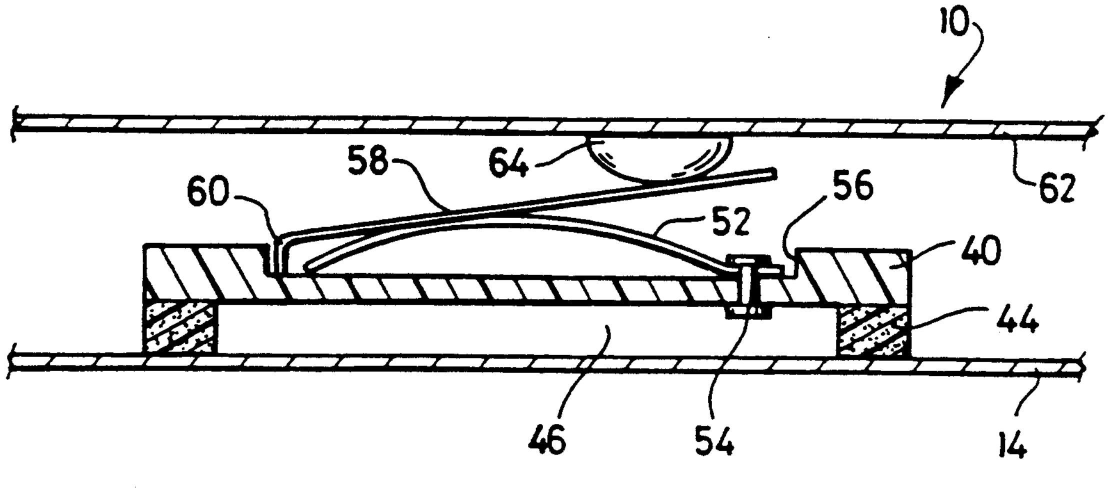
FIG. 6 is a cross section through the tool of FIG. 5, on the line VI—VI and showing an optional feature.

In order to prevent the tool body from possibly falling out of position when the door is closed and the vacuum is released, a spring device may be arranged on the back of the plate 40 as shown in FIG. 6. In this Figure a leaf spring 52 is secured by a rivet 54 in a recess 56 in the back of the plate 40. This spring 52 biases a plate 58 in a direction outwardly of the tool body. The plate 58 is hinged to the plate 40 at one end 60. FIG. 6 shows the situation when the door 10 is closed. Projecting from the door shut face 62 is a screw head 64 (this being one of the screws which secures the latch body to the edge of the door). In this position, the plate 58 is pushed against the spring 52 and the spring 52 pushes the plate 40 against the door pillar 14 so that the tool body cannot fall off the striker plate or become misaligned during the time when the vacuum chamber 46 is at atmospheric pressure. If there is no screw head 64 at the appropriate place, then the plate 58 would act against the sheet metal of the door shut face 62.

FIG. 1 shows how the flexible tube 18 will extend through the gap between the edge of the door 10 and the door pillar 14. There will usually be a gap here which is sufficient for a tube of about 5 mm outside diameter to pass through.

In an installation for use on a car assembly line, there may be a set of tool bodies 22 to provide dedicated bodies for the left and right hand doors of both 2-door and 4-door vehicle bodystyles.

Figure 7:
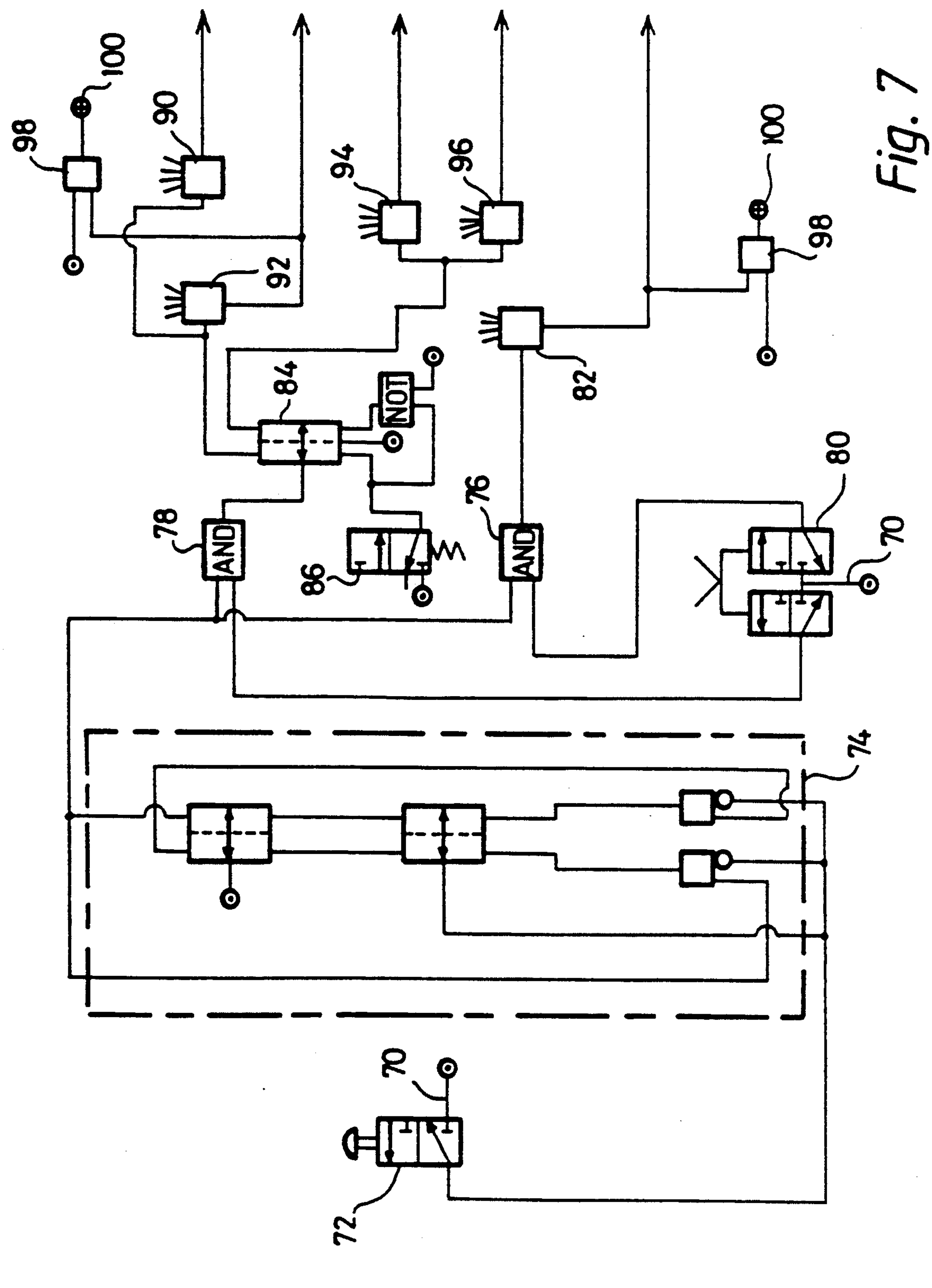
FIG. 7 is a pneumatic diagram illustrating the operation of a system of tools in accordance with the invention for acting on all the doors of a vehicle on an assembly line.

The pneumatic circuit shown in FIG. 7 controls the supply of vacuum to the appropriate tool body by directing compressed air to the appropriate tool. Air is supplied from a pressure line 70 via a push-button valve 72. Pushing the button allows a switching air pulse to pass via a binary counter 74 to two AND gates 76 and 78. The gate 76 feeds the tools for the 2-door body; the gate 78 feeds the tools for the 4-door body.

Operation of a twin-valve 80 directs a second stream of air to either the gate 76 or the gate 78. On receipt of both pulses, the gate opens and admits air to a venturi 82 which produces vacuum at the desired tool body. In the case of the gate 78, the air stream is directed to a memory unit 84. Operation of a switch 86, in conjunction with a NOT gate 88 controls whether the air passes to the front venturis 90, 92 or the rear venturis 94,96 to produce vacuum.

"VACO-STAT" units 98 (a trademark of the firm Crouzet of France) are incorporated in the circuit as devices to sense that the required vacuum has been achieved, and this gives a visible signal on an indicator light 100 to tell the operator that the setting operation can continue. In the drawing only two such units are shown, but in practice they will be associated with each venturi.

Pressing the valve 72 a second time shuts of all air to the venturis via the binary counter 74.

The tool described here allows accurate, individual setting of the striker plate for each door of each vehicle without the need for any great skill on the part of the operator. Although the tool has been developed primarily for setting the striker position on car doors where the setting is carried out on an assembly line, it could also be applied to other situations, for example where washing machines or similar items are produced on an assembly line. In an assembly line situation, the control box 16 may be suspended from an overhead support, with one or more tool bodies 22 suspended from the control box ready for use.

It will be appreciated that the tool and the method set out here may also be used to set the position of a loosely secured latch body relative to a fixed striker plate.

What is claimed is:

1. A method for aligning first and second latch members of a latch mechanism, said method comprising:

securing said first latch member firmly to a first surface;

securing said second latch member loosely to a second surface;

bringing said first and second surfaces together such that said first and second latch members contact each other and said first latch member moves said second latch member to a corrected position, said corrected position being one in which said first and second latch members are aligned for accurate engagement when said latch mechanism is in its closed position;

fixing said second latch member to said second surface at said corrected position using temporary fixing means;

separating said first latch member from said second latch member and said first surface from said second surface;

securing said second latch member firmly to said second surface at said corrected position; and disengaging said temporary fixing means.

2. The method as claimed in claim 8, wherein said temporary fixing means includes an opening therethrough which is complementary in shape to that of said second latch member, said second latch member being situated within said opening when said second latch member is fixed to said second surface by said temporary fixing means.

3. The method as claimed in claim 8, wherein said second latch member is a striker plate, and said first latch member is a latch body.

4. The method as claimed in claim 11, wherein said temporary fixing means is mounted to said second surface in surrounding relation with said striker plate before said first and second latch members and said first and second surfaces are brought together.

* * * * *